United States Patent
Mitsui et al.

(10) Patent No.: US 11,139,461 B2
(45) Date of Patent: Oct. 5, 2021

(54) METHOD FOR MANUFACTURING NICKEL-METAL HYDRIDE BATTERY AND NICKEL-METAL HYDRIDE BATTERY

(71) Applicant: Toyota Jidosha Kabushiki Kaisha, Toyota (JP)

(72) Inventors: Masahiko Mitsui, Toyota (JP); Junta Izumi, Nagoya (JP); Kenji Takahashi, Toyota (JP); Hiroyuki Kaiya, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 45 days.

(21) Appl. No.: 16/229,561

(22) Filed: Dec. 21, 2018

(65) Prior Publication Data

US 2019/0198855 A1    Jun. 27, 2019

(30) Foreign Application Priority Data

Dec. 25, 2017  (JP) .............................. JP2017-247501

(51) Int. Cl.
| | |
|---|---|
| *H01M 4/04* | (2006.01) |
| *H01M 4/525* | (2010.01) |
| *H01M 10/28* | (2006.01) |
| *H01M 10/44* | (2006.01) |
| *H01M 4/32* | (2006.01) |
| *H01M 10/34* | (2006.01) |
| *H01M 4/02* | (2006.01) |

(52) U.S. Cl.
CPC ........... *H01M 4/0438* (2013.01); *H01M 4/32* (2013.01); *H01M 4/525* (2013.01); *H01M 10/288* (2013.01); *H01M 10/345* (2013.01); *H01M 10/446* (2013.01); *H01M 2004/028* (2013.01)

(58) Field of Classification Search
CPC ....... H01M 4/04; H01M 4/0438; H01M 4/525
See application file for complete search history.

(56) References Cited

U.S. PATENT DOCUMENTS

| | | | |
|---|---|---|---|
| 6,020,088 A | 2/2000 | Singh | |
| 6,183,909 B1* | 2/2001 | Maeda | H01M 4/32 |
| | | | 429/223 |
| 2016/0254534 A1* | 9/2016 | Hayashi | H01M 4/32 |
| | | | 429/206 |

FOREIGN PATENT DOCUMENTS

| | | |
|---|---|---|
| CN | 1286812 A | 3/2001 |
| JP | H08-050919 A | 2/1996 |
| JP | H10-334913 A | 12/1998 |

(Continued)

OTHER PUBLICATIONS

VanderVen, et al., Phase Stability of Nickel Hydroxides and Oxyhydroxides, 2005, Journal of the Electrochemical Society, 153(2) A210-A215. (Year: 2005).*

*Primary Examiner* — Karie O'Neill Apicella
(74) *Attorney, Agent, or Firm* — Dinsmore & Shohl LLP

(57) ABSTRACT

A method for manufacturing a nickel-metal hydride battery includes: a first step of preparing a first nickel-metal hydride battery having a positive electrode including nickel hydroxide ($Ni(OH)_2$); and a second step of manufacturing the second nickel-metal hydride battery by performing 600% overcharging to the prepared first nickel-metal hydride battery. The 600% overcharging is a process for supplying the first nickel-metal hydride battery with an amount of electric power of 600% of the rated capacity of the first nickel-metal hydride battery.

4 Claims, 4 Drawing Sheets

(56) References Cited

FOREIGN PATENT DOCUMENTS

| | | |
|---|---|---|
| JP | 2004-273138 A | 9/2004 |
| JP | 2014-207789 A | 10/2014 |

\* cited by examiner

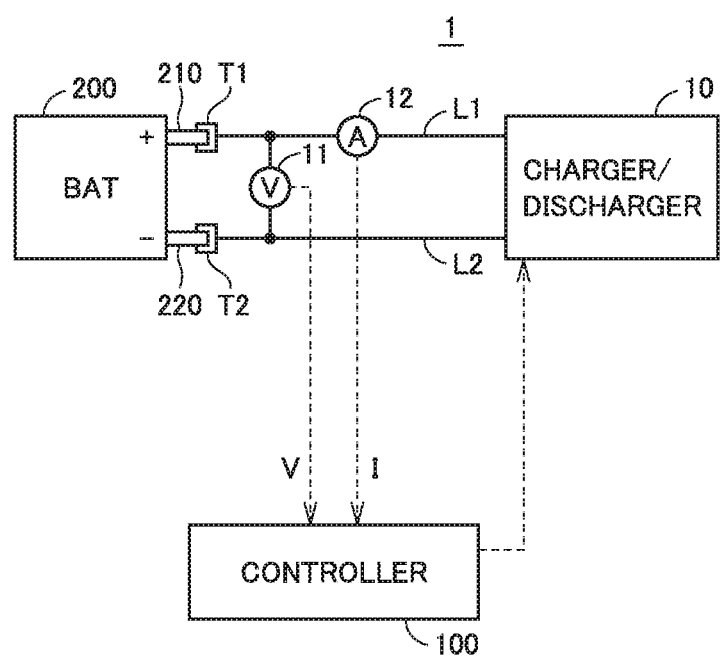

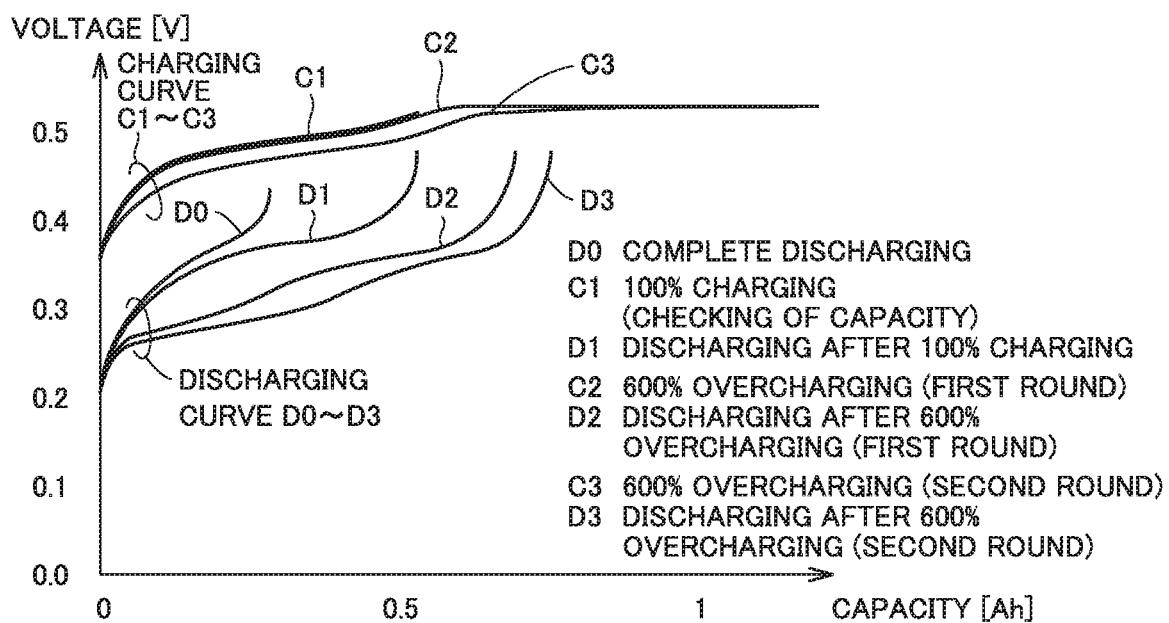

FIG.3

| OVERCHARGING CONDITIONS | | DISCHARGING CAPACITY (Ah) | | | RATIO OF INCREASE OF CAPACITY FROM THAT UPON CHECKING OF CAPACITY | | |
|---|---|---|---|---|---|---|---|
| | | UPON CHECKING OF CAPACITY | AFTER FIRST ROUND OF OVERCHARGING | AFTER SECOND ROUND OF OVERCHARGING | UPON CHECKING OF CAPACITY | AFTER FIRST ROUND OF OVERCHARGING | AFTER SECOND ROUND OF OVERCHARGING |
| 200% OVERCHARGING | BATTERY A | 0.5325 | 0.5799 | 0.5874 | 1 | 1.0890 | 1.1031 |
| | BATTERY B | 0.5368 | 0.5875 | 0.5957 | 1 | 1.0945 | 1.1097 |
| 600% OVERCHARGING | BATTERY C | 0.5386 | 0.7119 | 0.7726 | 1 | 1.3217 | 1.4345 |
| | BATTERY D | 0.5319 | 0.6888 | 0.7504 | 1 | 1.2950 | 1.4109 |

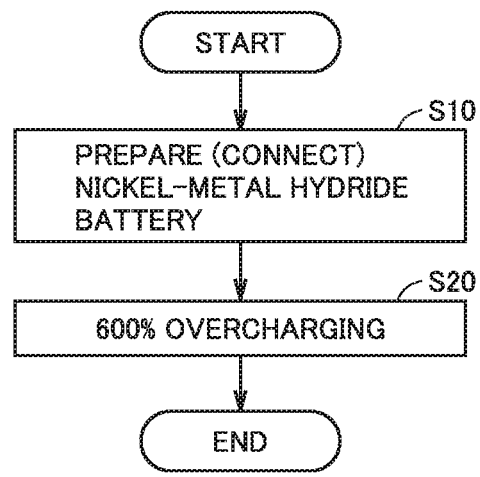

METHOD FOR MANUFACTURING NICKEL-METAL HYDRIDE BATTERY AND NICKEL-METAL HYDRIDE BATTERY

CROSS REFERENCE TO RELATED APPLICATIONS

This non-provisional application claims priority to Japanese Patent Application 2017-247501 filed on Dec. 25, 2017, with the Japan Patent Office, the entire contents of which are hereby incorporated by reference.

BACKGROUND

Field

The present disclosure relates to a technique for increasing the capacity of a nickel-metal hydride battery.

Description of the Background Art

Japanese Patent Laying-Open No. 2014-207789 discloses a technique for restoring the capacity of a nickel-metal hydride battery. In this technique, a nickel-metal hydride battery including a negative electrode having a deteriorated discharging capacity is overcharged to supply the negative electrode with hydrogen. Accordingly, the discharging capacity of the negative electrode can be restored, thereby restoring the capacity of the entire battery.

SUMMARY

In the technique disclosed in Japanese Patent Laying-Open No. 2014-207789, the nickel-metal hydride battery is overcharged to supply the negative electrode with hydrogen, thereby restoring the discharging capacity of the negative electrode.

However, the capacity of the nickel-metal hydride battery is deteriorated due to not only the deterioration of the capacity of the negative electrode but also deterioration of the capacity of a positive electrode. Depending on how the nickel-metal hydride battery is used, the deterioration of the positive electrode may be dominant. When the deterioration of the positive electrode is dominant, it is concerned that the capacity of the nickel-metal hydride battery cannot be effectively restored by the technique disclosed in Japanese Patent Laying-Open No. 2014-207789.

The present disclosure has been made to solve the above-described problem, and has an object to increase the capacity of a positive electrode of a nickel-metal hydride battery.

(1) A method for manufacturing a nickel-metal hydride battery according to the present disclosure includes: preparing a first nickel-metal hydride battery having a positive electrode including nickel hydroxide; and manufacturing a second nickel-metal hydride battery by charging the first nickel-metal hydride battery to change, into nickel oxide, at least part of the nickel hydroxide in the positive electrode of the first nickel-metal hydride battery. Nickel in the nickel oxide has a valence of more than 3.

According to the above-described method, by charging the first nickel-metal hydride battery in the manufacturing of the second nickel-metal hydride battery, the part of the nickel hydroxide ($Ni(OH)_2$) included in the positive electrode of the first nickel-metal hydride battery is changed into the nickel oxide (for example, $NiOOK_{1/3}$). The nickel in the nickel oxide (for example, $NiOOK_{1/3}$) has a valence of more than 3. That is, the nickel in the nickel oxide after the change has a valence (for example, 3.66) that is larger than "2" which is the valence of the nickel in the original nickel oxide ($Ni(OH)_2$), and larger than "3" which is the valence of nickel in nickel oxyhydroxide ($NiOOH$) that may be also generated during normal charging. Therefore, a capacity for accepting hydrogen in the positive electrode of the second nickel-metal hydride battery manufactured in the manufacturing of the second nickel-metal hydride battery becomes larger than a capacity for accepting hydrogen in the positive electrode of the first nickel-metal hydride battery. As a result, the capacity of the positive electrode of the nickel-metal hydride battery can be increased.

(2) In a certain embodiment, an amount of electric power supplied to the first nickel-metal hydride battery in the manufacturing of the second nickel-metal hydride battery is more than or equal to 600% of a rated capacity of the first nickel-metal hydride battery.

According to the above-described embodiment, the capacity of the positive electrode can be increased by supplying the first nickel-metal hydride battery with the amount of electric power of more than or equal to 600% of the rated capacity of the first nickel-metal hydride battery in the manufacturing of the second nickel-metal hydride battery in order to cause the above-described structural change of the positive electrode.

(3) In a certain embodiment, the positive electrode of the first nickel-metal hydride battery further includes, in addition to the nickel hydroxide, nickel oxide deactivated due to deterioration.

According to the above-described embodiment, by charging, in the manufacturing of the second nickel-metal hydride battery, the first nickel-metal hydride battery having the positive electrode including the nickel oxide ($Ni_2O_3$) deactivated due to the deterioration, remaining nickel hydroxide ($Ni(OH)_2$) having not been deactivated yet can be changed into nickel oxide (for example, $NiOOK_{1/3}$). Accordingly, the capacity of the positive electrode of the first nickel-metal hydride battery can be restored.

(4) Another method for manufacturing a nickel-metal hydride battery according to the present disclosure includes: preparing a first nickel-metal hydride battery having a positive electrode including nickel hydroxide; and manufacturing a second nickel-metal hydride battery by supplying the first nickel-metal hydride battery with an amount of electric power of more than or equal to 600% of a rated capacity of the first nickel-metal hydride battery.

According to the above-described method, it is presumed that by supplying the first nickel-metal hydride battery with the amount of electric power of more than or equal to 600% of the rated capacity of the first nickel-metal hydride battery in the manufacturing of the second nickel-metal hydride battery, part of nickel hydroxide ($Ni(OH)_2$) included in the positive electrode of the first nickel-metal hydride battery is changed into nickel oxide (for example, $NiOOK_{1/3}$). Nickel in the nickel oxide (for example, $NiOOK_{1/3}$) has a valence of more than 3. That is, the nickel in the nickel oxide after the change has a valence (for example, 3.66) that is larger than "2", which is the valence of the nickel in the nickel oxide ($Ni(OH)_2$) before the change, and larger than "3", which is the valence thereof in the nickel oxyhydroxide ($NiOOH$) that may be also generated during normal charging. Therefore, a capacity for accepting hydrogen in the positive electrode of the second nickel-metal hydride battery manufactured in the manufacturing of the second nickel-metal hydride battery becomes larger than a capacity for accepting hydrogen in the positive electrode of the first nickel-metal hydride battery. As a result, the capacity of the positive electrode of the nickel-metal hydride battery can be increased.

(5) A nickel-metal hydride battery according to the present disclosure includes a positive electrode. The positive electrode includes nickel hydroxide and nickel oxide. Nickel in the nickel oxide has a valence of more than 3.

The positive electrode of the nickel-metal hydride battery includes not only the nickel hydroxide ($Ni(OH)_2$) but also the nickel oxide (for example, $NiOOK_{1/3}$). Nickel in the nickel oxide has a valence (for example, 3.66) that is larger than "2" which is the valence of nickel in the nickel oxide ($Ni(OH)_2$), and larger than "3" which is the valence thereof in nickel oxyhydroxide ($NiOOH$) that may be also generated during normal charging. Therefore, the nickel-metal hydride battery according to the present disclosure has a larger capacity for accepting hydrogen in the positive electrode than that of a conventional nickel-metal hydride battery having a positive electrode including no nickel oxide (for example, $NiOOK_{1/3}$). As a result, there can be obtained a nickel-metal hydride battery including a positive electrode having a capacity increased as compared with that in the conventional technique.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 1 schematically shows an exemplary entire configuration of a nickel-metal hydride battery and a charging/discharging device.

FIG. 2 shows exemplary charging/discharging curves when a test is conducted to confirm an increase of capacity by 600% overcharging.

FIG. 3 shows a result of the test conducted to confirm the increase of capacity by the 600% overcharging.

FIG. 4 is a flowchart showing a procedure of a method (re-manufacturing method) for manufacturing the nickel-metal hydride battery.

DESCRIPTION

The following describes embodiments of the present disclosure with reference to figures in detail. It should be noted that the same or corresponding portions in the figures are given the same reference characters and are not described repeatedly.

FIG. 1 schematically shows an exemplary entire configuration of a nickel-metal hydride battery 200 and a charging/discharging device 1 used in a manufacturing method according to the present embodiment.

It should be noted that the following describes a method (re-manufacturing method) for re-manufacturing nickel-metal hydride battery 200 by using charging/discharging device 1 to restore the capacity of nickel-metal hydride battery 200 having been deteriorated due to use (repeated charging and discharging). However, the manufacturing method according to the present disclosure is not limitedly applied to the re-manufacturing method. For example, the manufacturing method according to the present disclosure is applicable to a method (manufacturing method) for manufacturing a finished product of nickel-metal hydride battery 200 by increasing the capacity of an unfinished (unused) nickel-metal hydride battery 200 using charging/discharging device 1.

Nickel-metal hydride battery 200 includes a positive electrode terminal 210 and a negative electrode terminal 220. An internal structure of nickel-metal hydride battery 200 before applying the manufacturing method according to the present disclosure is equivalent to that of a known nickel-metal hydride battery. That is, although not shown in the figure, nickel-metal hydride battery 200 includes a positive electrode plate, a negative electrode plate, and an electrolyte solution that ionically combines them with each other. The positive electrode plate includes a positive electrode active material including nickel hydroxide ($Ni(OH)_2$). The negative electrode plate includes a hydrogen storage alloy. Moreover, the electrolyte solution is an alkaline aqueous solution including KOH.

Charging/discharging device 1 is configured to charge and discharge nickel-metal hydride battery 200. Charging/discharging device 1 includes a charger/discharger 10, measurement terminals T1, T2, lead wires L1, L2, and a controller 100.

Measurement terminals T1, T2 are respectively connectable to positive electrode terminal 210 and negative electrode terminal 220 of nickel-metal hydride battery 200. Measurement terminals T1, T2 are connected to charger/discharger 10 by lead wires L1, L2.

When measurement terminals T1, T2 are connected to positive electrode terminal 210 and negative electrode terminal 220 of nickel-metal hydride battery 200 as a result of, for example, an operator's manual operation, nickel-metal hydride battery 200 is brought into such a state that nickel-metal hydride battery 200 can be charged and discharged by charger/discharger 10. In this state, charger/discharger 10 is operated in accordance with a control signal from controller 100 to charge and discharge nickel-metal hydride battery 200.

Further, a voltage sensor 11 and a current sensor 12 are provided in charging/discharging device 1. Voltage sensor 11 measures voltage between lead wires L1, L2 (voltage between positive electrode terminal 210 and negative electrode terminal 220 of nickel-metal hydride battery 200) and transmits the measurement result to controller 100. Current sensor 12 measures current flowing in lead wire L1 (current flowing between nickel-metal hydride battery 200 and charger/discharger 10) and transmits the measurement result to controller 100. It should be noted that when a monitoring unit including a voltage sensor, a current sensor, and the like is included in nickel-metal hydride battery 200, information from the monitoring unit may be transmitted to controller 100.

Controller 100 includes a CPU (Central Processing Unit) and a memory (not shown), and controls charger/discharger 10 based on information stored in the memory or information from each of sensors 11, 12.

The re-manufacturing method according to the present embodiment is a method for re-manufacturing nickel-metal hydride battery 200 having a capacity restored by using charging/discharging device 1 to overcharge nickel-metal hydride battery 200 having a deteriorated capacity. Hereinafter, the re-manufacturing method according to the present embodiment will be described in detail.

<Method for Re-Manufacturing Nickel-Metal Hydride Battery 200>

The capacity of a nickel-metal hydride battery can be deteriorated gradually due to use thereof. It is considered that one of the causes of the deterioration of the capacity is deterioration of the capacity of a negative electrode due to dissociation of hydrogen from a hydrogen storage alloy of the negative electrode. In the technique disclosed in Japanese Patent Laying-Open No. 2014-207789, the nickel-metal hydride battery is overcharged to supply the negative electrode with hydrogen, thereby restoring the capacity of the negative electrode.

However, the capacity of the nickel-metal hydride battery is deteriorated due to not only the deterioration of the capacity of the negative electrode but also deterioration of the capacity of a positive electrode. Specifically, part of nickel hydroxide ($Ni(OH)_2$), which is a positive electrode active material, becomes nickel oxide ($Ni_2O_3$) due to the deterioration and is accordingly deactivated. Accordingly, the capacity of the positive electrode may be deteriorated.

When the deterioration of the capacity of the positive electrode is dominant, it is concerned that the capacity of the nickel-metal hydride battery cannot be effectively restored even though the discharging capacity of the negative electrode is restored by performing overcharging in the conventional manner in order to supply the negative electrode with hydrogen as disclosed in Japanese Patent Laying-Open No. 2014-207789.

As a result of experiments and examinations conducted by the inventors of the present application to solve such a problem, it has been found that the deteriorated capacity of the positive electrode of the nickel-metal hydride battery can be restored by performing a process (hereinafter, also referred to as "600% overcharging") for supplying the nickel-metal hydride battery with an amount of electric power of 600% of the rated capacity of the nickel-metal hydride battery. Hereinafter, this point will be described.

In normal charging (charging in which the nickel-metal hydride battery is supplied with an amount of electric power of less than the rated capacity), nickel hydroxide ($Ni(OH)_2$), which is a positive electrode active material, is changed to nickel oxyhydroxide (NiOOH).

However, when the 600% overcharging is performed, it is presumed that part of the nickel hydroxide ($Ni(OH)_2$) becomes nickel oxyhydroxide (NiOOH), which is then changed into nickel oxide ($NiOOK_{1/3}$). That is, it is presumed that by performing the 600% overcharging, a reaction shown in the following formula (1) takes place in the positive electrode:

$$Ni(OH)_2 \rightarrow NiOOK_{1/3} + 5/3 H^+ \qquad \text{Formula (1)}$$

The nickel (Ni) included in the nickel oxide ($NiOOK_{1/3}$) after the change has a valence of "3.66". This valence is larger than "2" which is the valence of the nickel (Ni) in the original nickel hydroxide ($Ni(OH)_2$), and is larger than "3" which is the valence of nickel (Ni) in nickel oxyhydroxide (NiOOH) that may be also generated during the normal charging.

Therefore, a capacity for accepting hydrogen in the positive electrode of nickel-metal hydride battery 200 (second nickel-metal hydride battery) after the 600% overcharging becomes larger than a capacity for accepting hydrogen in the positive electrode of nickel-metal hydride battery 200 (first nickel-metal hydride battery) before the 600% overcharging. As a result, the capacity of the positive electrode of nickel-metal hydride battery 200 can be increased.

FIG. 2 shows exemplary charging/discharging curves when a test is conducted to confirm an increase of capacity by the 600% overcharging. In FIG. 2, the horizontal axis represents a power storage capacity (unit: Ah (amp-hour)) of nickel-metal hydride battery 200, whereas the vertical axis represents a voltage (unit: V) of nickel-metal hydride battery 200.

This confirmatory test was performed in the following procedure. First, a nickel-metal hydride battery 200 having a deteriorated capacity is connected to charger/discharger 10 and is completely discharged. A discharging curve D0 represents a locus in the case of complete discharging.

Next, charging (100% charging) is performed to check the initial capacity thereof before the overcharging. A charging curve C1 represents a locus in the case of the 100% charging. After the 100% charging, complete discharging is performed again. A discharging curve D1 represents a locus in this case.

Next, a first round of 600% overcharging is performed. A charging curve C2 represents a locus in the case of the first round of 600% overcharging. After the first round of 600% overcharging, complete discharging is performed again. A discharging curve D2 represents a locus in this case.

Next, a second round of 600% overcharging is performed. Charging curve C3 represents a locus in the case of a second round of 600% overcharging. After the second round of 600% overcharging, complete discharging is performed again. A discharge curve D3 represents a locus in this case.

As shown in charging curves C1 to C3 and discharging curves D1 to D3 in FIG. 2, it is understood that by performing the 600% overcharging, charging/discharging characteristics are changed. Specifically, by performing the 600% overcharging, the charging and discharging curves indicate a tendency of reduced voltage (tendency of reduced voltage with respect to the same power storage capacity). This is particularly noticeable in the case of the discharge curves. This is presumably due to restoration of the capacity.

FIG. 3 shows a result of the above-described confirmatory test. As the result of the confirmatory test, FIG. 3 shows the discharging capacity (unit: Ah) after the charging as well as a ratio of increase of capacity from the initial capacity upon the checking of the initial capacity, a ratio of increase of capacity from the initial capacity after the first round of overcharging, and a ratio of increase of capacity from the initial capacity after the second round of overcharging.

It should be noted that for comparison with the result of the 600% overcharging, FIG. 3 also shows a result of 200% overcharging. Specifically, FIG. 3 shows that among four batteries A to D having substantially the same initial capacities before the overcharging, batteries A, B were subjected to the "200% overcharging" twice, and batteries C, D were subjected to the above-described "600% overcharging" twice. It should be noted that the "200% overcharging" is a process for supplying the nickel-metal hydride battery with an amount of electric power of 200% of the rated capacity of the nickel-metal hydride battery, and corresponds to the conventional overcharging for supplying the negative electrode with hydrogen.

As understood from FIG. 3, the initial capacities of batteries A to D are substantially the same, i.e., about 0.53. After performing the 200% overcharging (conventional overcharging) twice, the capacities of batteries A, B are restored only to about 1.1 times as large as the initial capacity. This is presumably because the capacity of the negative electrode is restored by supplying hydrogen to the hydrogen storage alloy of the negative electrode in the 200% overcharging (conventional overcharging).

On the other hand, after performing the 600% overcharging according to the present disclosure twice, the capacity of each of batteries C, D is restored to about 1.4 times as large as the initial capacity. From this result, it can be understood that the 600% overcharging is very effective to restore the capacity. This is presumably due to the following reasons: the capacity of the negative electrode was restored by supplying hydrogen to the hydrogen storage alloy of the negative electrode; and the capacity of the positive electrode was restored due to occurrence of a structural change resulting from the reaction shown in the above-described formula (1) in the positive electrode.

FIG. 4 is a flowchart showing a procedure of the manufacturing method (re-manufacturing method) according to some embodiments. The manufacturing method according to some embodiments includes: a first step (step S10) of preparing a nickel-metal hydride battery 200 (first nickel-metal hydride battery) having a positive electrode including nickel hydroxide ($Ni(OH)_2$); and a second step (step S20) of performing the above-described 600% overcharging to prepared nickel-metal hydride battery 200 (first nickel-metal hydride battery).

In the first step (step S10), nickel-metal hydride battery 200 that was deteriorated due to use, for example, is prepared and is connected to charger/discharger 10. This process is performed by an operator's manual operation, for example.

In the second step (step S20), controller 100 controls charger/discharger 10 to perform the 600% overcharging to prepared nickel-metal hydride battery 200. Accordingly, the structural change shown in the above-described formula (1) occurs in the positive electrode, thereby manufacturing nickel-metal hydride battery 200 having the positive electrode with a restored capacity.

As described above, the method for manufacturing the nickel-metal hydride battery according to some embodiments includes: the first step of preparing nickel-metal hydride battery 200 (first nickel-metal hydride battery) having the positive electrode including nickel hydroxide (Ni$(OH)_2$); and the second step of manufacturing nickel-metal hydride battery 200 (second nickel-metal hydride battery) by performing the 600% overcharging to the prepared nickel-metal hydride battery.

According to this method, as shown in the above-described formula (1), it is presumed that part of the nickel hydroxide ($Ni(OH)_2$) included in the positive electrode of nickel-metal hydride battery 200 is changed into the nickel oxide ($NiOOK_{1/3}$). Nickel in the nickel oxide ($NiOOK_{1/3}$) after the change has a valence of "3.66". This valence is larger than "2" which is the valence of the nickel in the nickel hydroxide ($Ni(OH)_2$) before the change, and is larger than "3" which is the valence thereof in the nickel oxyhydroxide (NiOOH) that may be also generated during the normal charging. Therefore, the capacity for accepting hydrogen in the positive electrode of nickel-metal hydride battery 200 manufactured in the second step and having been through the 600% overcharging becomes larger than the capacity for accepting hydrogen in the positive electrode of the first nickel-metal hydride battery not having been through the 600% overcharging yet. As a result, the capacity of the positive electrode of the nickel-metal hydride battery can be increased.

In other words, according to the manufacturing method according to some embodiments, a nickel-metal hydride battery having a new structure can be manufactured in which a positive electrode includes not only nickel hydroxide ($Ni(OH)_2$) but also nickel oxide ($NiOOK_{1/3}$). Hence, there can be obtained a nickel-metal hydride battery including a positive electrode having a capacity increased as compared with that of the conventional nickel-metal hydride battery having a positive electrode including no nickel hydroxide ($Ni(OH)_2$).

It should be noted that in the above-described embodiments, it has been illustratively described that the "600% overcharging" is performed in the second step. However, the amount of electric power supplied to nickel-metal hydride battery 200 in the second step is not necessarily limited to "600%" of the rated capacity as long as the amount of electric power supplied to nickel-metal hydride battery 200 in the second step is an amount of electric power that can cause occurrence of the structural change of the positive electrode as shown in the formula (1).

For example, an amount of electric power of more than 600% of the rated capacity may be supplied to nickel-metal hydride battery 200 in the second step. Also in this way, it is presumed that the structural change shown in the formula (1) can occur in the positive electrode. It should be noted that the upper limit of the amount of electric power supplied to nickel-metal hydride battery 200 is considered to be set to a value (for example, 1000% of the rated capacity) that does not cause abnormalities in each portion of nickel-metal hydride battery 200.

Moreover, the amount of electric power supplied to nickel-metal hydride battery 200 in the second step may be set to less than 600% of the rated capacity (for example, 590%) as long as the structural change of the positive electrode shown in the formula (1) can be caused. It should be noted that the lower limit of the amount of electric power supplied to nickel-metal hydride battery 200 is considered to be set to at least a value of more than 200% of the rated capacity in view of the above-described result shown in FIG. 3.

Moreover, as described at the beginning, the manufacturing method according to the present disclosure is not limitedly applied to the re-manufacturing method for restoring the capacity of the nickel-metal hydride battery deteriorated due to use. The manufacturing method according to the present disclosure is also applicable to a method for manufacturing a finished product of a nickel-metal hydride battery by increasing the capacity of an unfinished (unused) nickel-metal hydride battery.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A method for manufacturing a nickel-metal hydride battery, the method comprising:
   preparing a first nickel-metal hydride battery having a positive electrode including nickel hydroxide; and
   manufacturing a second nickel-metal hydride battery by charging the first nickel-metal hydride battery to change, into nickel oxide, at least part of the nickel hydroxide in the positive electrode of the first nickel-metal hydride battery, wherein manufacturing the second nickel-metal hydride battery comprises:
   performing a first round of overcharging of the first nickel-metal hydride battery with an amount of electric power of more than or equal to 600% of a rated capacity of the first nickel-metal hydride battery;
   completely discharging the first nickel-metal hydride battery; and
   performing a second round of overcharging of the first nickel-metal hydride battery with an amount of electric power of more than or equal to 600% of a rated capacity of the first nickel-metal hydride battery; and wherein nickel in the nickel oxide has a valence of more than 3.

2. The method for manufacturing the nickel-metal hydride battery according to claim 1, wherein the positive electrode of the first nickel-metal hydride battery further includes, in addition to the nickel hydroxide, nickel oxide deactivated due to deterioration.

3. The method for manufacturing the nickel-metal hydride battery according to claim 1, wherein the nickel oxide comprises the formula $NOOK_{1/3}$.

4. The method for manufacturing the nickel-metal hydride battery according to claim 1, wherein the nickel oxide has a valence of 3.66.

* * * * *